US007011323B1

(12) United States Patent
Sayed

(10) Patent No.: US 7,011,323 B1
(45) Date of Patent: Mar. 14, 2006

(54) HIGH SPEED BICYCLE

(76) Inventor: Naser M. Sayed, 7304 5th Ave., Suite 145, Brooklyn, NY (US) 11209

( * ) Notice: Subject to any disclaimer, the term of this patent is extended or adjusted under 35 U.S.C. 154(b) by 0 days.

(21) Appl. No.: 10/335,770

(22) Filed: Jan. 2, 2003

(51) Int. Cl.
*B62M 1/06* (2006.01)
(52) U.S. Cl. ..................................... 280/261; 280/260
(58) Field of Classification Search ................ 280/260, 280/261
See application file for complete search history.

(56) References Cited

U.S. PATENT DOCUMENTS

| 490,252 A | 1/1893 | Jenkins |
| 520,796 A | 6/1894 | Mayne |
| 559,299 A * | 4/1896 | Matthern ..................... 280/261 |
| 641,980 A | 1/1900 | Lower |
| 789,580 A | 5/1905 | Trainor |
| 799,580 A * | 9/1905 | Trainor ....................... 251/212 |
| 1,154,292 A * | 9/1915 | Cribbs ......................... 280/261 |
| 1,360,032 A | 11/1920 | Schiffner et al. |
| 1,380,082 A | 5/1921 | Schieder |
| 1,535,714 A | 4/1925 | Burke |
| 1,630,442 A * | 5/1927 | Makris ........................ 280/261 |
| 3,921,467 A | 11/1975 | Matsuura |
| 5,102,155 A | 4/1992 | Chou |
| 5,209,507 A | 5/1993 | Domenge |
| 5,577,749 A * | 11/1996 | Ross ........................... 280/261 |
| 5,607,171 A * | 3/1997 | Labranche ............... 280/288.1 |
| 5,901,973 A * | 5/1999 | Warren ........................ 280/260 |
| 5,913,741 A | 6/1999 | Balajadia |
| 5,979,924 A | 11/1999 | D'Aluisio et al. |

\* cited by examiner

*Primary Examiner*—Lesley D. Morris
*Assistant Examiner*—Daniel Yeagley
(74) *Attorney, Agent, or Firm*—Charles A. Wilkinson; Clinton H. Wilkinson

(57) ABSTRACT

A drive for a bicycle includes an auxiliary sprocket wheel assembly having two sets of at least three sprocket wheels associated in each assembly attached to a common axle, one of said sets having a larger diameter than the other set. Each set is provided with a derailleur for changing associated sprocket chains from one sprocket of the set to another. Use of the auxiliary sprocket wheel assembly together with derailleurs on the regular pedal and drive wheel sprockets enables very high speeds to be attained by the average rider.

6 Claims, 6 Drawing Sheets

HIGH SPEED BICYCLE

FIELD OF THE INVENTION

This invention relates to self-propelled vehicles and more particularly to bicycles incorporating both more or additional gearing and additional gear changing apparatus than normal in order to obtain additional efficiency and adaptability to various conditions. More particularly still, this invention relates to the use of a bicycle having gear changing apparatus as well as multiple apparatus not only on the pedal mechanism and the rear drive wheels, but also an additional double sprocket assembly gearing arrangement positioned below the seat and toward the back of the bike, such additional gearing being provided with multiple sprocket wheels plus at least two independent gear changing devices for maximum independent gear changing ability.

BACKGROUND OF THE INVENTION

Bicycles were originally developed to increase the speed and ease of progressing over the surface of the Earth. All land animals are able to progress over the surface of the Earth by the use of either legs or by the use of undulations such as used by snakes, snails, and the like. Some snakes are able to progress at a remarkable rate which, however, is nowhere near as rapid as many life forms and particularly mammals and reptiles are able to attain by the use of legs. The use of legs, however, requires considerable energy for activation of the back and forth motion of such legs. Each forward propelling motion made by a leg requires a corresponding reversal of motion to retain a position wherein the leg can again propel the animal forward over the surface. Furthermore, with a decreasing number of legs the motion of the organism over the ground becomes more and more undulating. Thus an insect with six legs may run almost level, a four legged mammal with accelerated movement will demonstrate more up and down motion and a two legged mammal, bird, or reptile will demonstrate still more up and down or vertical movement associated with forward motion, since the "gate," or leg facilitated motion, of the organism is basically a matter of lifting the body to its maximum standing height and then allowing the body to fall or pivot forward and down before being caught by at least one leg before sinking too low for such leg to raise the body up again and enable it to be carried forward either by the other paired leg or in a four footed animal often by the pair of legs behind. Energy is saved by having to move fewer legs as one progresses to a two-legged stride. However, having to catch the body as it falls forward and downward and lift it up again for every stride also takes significant extra energy. The advantage of having fewer legs thus ultimately is used up in continuously lifting the body upwardly. Legs also have an advantage in progressing over rough ground, provided an effective sight and obstacle avoidance system is incorporated into the animal as part of its onboard computer or computer guidance system, or brain. Humans, or homosapiens, discovered, or realized, somewhere on the Eurasian landmass more than five millennia ago that a round section of a tree trunk can roll along a smooth surface with a minimum of dissipated energy. This led after a time to simple two wheeled carts and then chariots. Strangely, the wheel concept was never discovered by the indigenous peoples of the new world, Australia and the Pacific Basin. However, in Eurasia, where it was, the necessity for cleared paths or roads which could accommodate wheeled vehicles drawn by animal or human power become gradually evident.

Once sufficient reasonably constructed or smooth roads became available, furthermore, the use of on board power for vehicles became possible. On board power was provided either by internal combustion engines or external combustion or steam engines or in the case of the bicycle, human muscle power. A wheeled vehicle on a reasonably smooth surface does not require significant power to lift the vehicle plus any passengers upwardly with every step, thus saving a very considerable amount of energy as it progresses along the road. Such saved or preserved energy or excess energy can then be used in accelerating forward movement of the vehicle. With the invention of the bicycle, the decrease of energy necessary for maintaining horizontal movement of the vehicle made it practical to progress over the surface of the ground either with the expenditure of much less energy than necessary for walking or even running or, with the exertion of the same energy, to go very considerably faster. Initially, bicycles utilized a large wheel propelled or rotated directly by pedals attached to central portions of the drive wheel or alternatively to the shaft upon which the drive wheel was mounted, thus gaining a mechanical advantage which allowed the bicycle to attain speeds unobtainable by foot. Bicycles were initially, therefore, mechanical devices developed to travel faster over smooth surfaces than is possible by foot, or capable of traveling at similar speeds as attainable on foot but with the expenditure of significantly less energy. Bicycles were thus initially devices for moving across the ground at a faster speed using a lesser amount of energy than was possible on foot. It is strange in view of this original genesis of bicycles that modern bicycling has developed into a form of exercise using a lesser amount of energy, no doubt a major reason why it is popular as an exercise medium, since a bicycle can be characterized as a mechanical device for obtaining exercise with the expenditure of less energy or less exercise. Those who like bicycling and want to use more energy can, of course, increase their speed until they are in fact using more energy rather than less than they would for mere walking or even fairly leisurely jogging or running.

The use of a rotating wheel in bicycles and other wheeled vehicles not only saves energy by eliminating the up and down motion characteristic of progression over a surface by means of legs, at least assuming the absence of potholes, but also by maintaining the movement of the wheel progressing over the surface in a single direction without periodic reversals of movement. Not only is the forward momentum of the body maintained, but the motion or momentum of the wheel itself is maintained in a single direction about its axis so it maintains at least a single rotational momentum or angular momentum, although not a completely uniform momentum with respect to the vehicle. A wheel, however, does avoid periodic complete reversal of motion. The continuous angular change of motion of the rim of the wheel as it rotates about the axis of the wheel, while using excess energy, is nowhere near as wasteful of energy as complete reversal of motion as found in the movement of legs progressing in a back and forth motion.

It is a remarkable fact that nature in the form of land animals has never developed through evolution any organ operating in the same manner as a wheel, probably due to the technical problems of passing blood vessels or nerves successfully past an axis of rotation, although some insects attain a similar semi-rotary motion of their wings and some fish come close to rotary motion of their pectoral fins, not directly about an axis, but at a lateral angle about what is in effect at least a semi-axis.

Since the advantages of the gearing principle applicable to effecting bicycle movement was evident from the first and the disadvantages of having the mechanical advantage means positioned on the wheel used for steering became quickly evident, it was not long before the mechanically minded began applying the pedal mediated power in bicycles to a rear wheels through a chain drive device or similar arrangement, the mechanical advantage being obtained by using a relatively small sprocket in conjunction with the pedals and a still smaller sprocket in conjunction with the large drive wheel. The use of additional sprockets to obtain additional mechanical advantage quickly followed and various gear changing arrangements began to be used after the Second World War. At first, these allowed one to change the gear ratio only on the rear sprocket, using gear levers on the handle bar. This has now resulted in the use of several gear changing mechanisms, usually in the form of a so-called derailleur which biases a drive chain to the side from one gear sprocket to another gear sprocket alongside. While at one time it was necessary to either stop the bicycle or at least slow such bicycle drastically to change the gear mechanism, modern derailleurs do not require such slowing of movement, but are enabled to shift smoothly while moving and in fact frequently require one to be peddling at the time the gear ratio is changed by shifting the sprocket chain from one sprocket gear to another. It is this type of gear changer, or derailleur, that is used in conjunction with the present inventor's high speed bicycle system.

While bicycles therefore were originally developed to enable users thereof to travel along roads, pavements and streets at a faster rate and with the expenditure of less energy than is possible on foot, either by walking or running, by the judicious or effective use of favorable gear ratios, it has not been possible for the average rider to effectively attain really elevated or rapid speeds. While bicycles have been developed with multiple extended gear ratios to either attain rapid movement with the expenditure of minimum or very reduced energy and gear changing arrangements, frequently referred to as derailleurs, principally so that lower gear ratios can be used when ascending grades of various pitches or inclinations, and while specialized high speed bikes for racing have been designed, there has been no effective high speed bike for mass or everyday use. When derailleurs, which enable the gear ratio of the drive chain of a bicycle to be altered by the shifting the drive chain from one size sprocket to another and thereby allowing the effective leverage or gear ratio applied to the drive wheel by the muscles of the legs of the bicyclist to be effectively changed by changing the size of the sprocket the chain revolves around, the derailleur had at first to be operated either while the bike was stationary or moving relatively slowly. This required the bike to be essentially stopped when it was desired to change the gear ratio. This limited the gear changing to adjusting essentially to major changes in inclination of the landscape. More modern derailleurs, however, can now change the position of the drive chain from one sprocket wheel to another while the bicycle is moving and, in fact, frequently require movement of the sprockets in order to effect efficient change from one gear to another. Bicycles have, as a result, become even more practical for both personal transportation and for sport or exercise by those who enjoy traveling over the terrain at relatively elevated speeds compared to the speed which could be attained with the same amount of energy expenditure on foot. Nevertheless, while bicycles have become very efficient, practical mass transportation devices, high-speed bikes have not been available. Carefully analyzing this anomaly, the present inventor has realized that the problem lies in the relative relationship or interrelationship of changing gear ratios, the accompanying momentum of the bicycle and rider at the time of gear changing and the relative high gear ratios necessary to drive a bicycle at high speeds combined with the relative restricted maximum rapidity of movement of the legs of the usual rider. While professional or even amateur bicycle racers with powerful well trained and conditioned legs are able to and, in fact, revel in moving their legs rapidly about the pedals of a bike, thereby attaining very rapid velocities, the normal, or average, rider does not have such well trained legs and can neither attain the leg thrust or power nor the rapidity of leg movement that a well conditioned bicycle racer can. As a result, the normal everyday rider reasonably enough requires more effective gear ratios to attain high speeds. In other words, the gear ratio of the bike must be such that the average rider moving the pedals at a reasonable rate and with a comfortable or easily attainable force will be able to attain a high speed. However, the problem is that with the high gear ratios necessary to achieve high speeds any impediment to forward movement such as a slight grade, a slight opposite wind or the like will cause a relative high retarding force, such force being immediately applied with very little mitigation to the legs of the rider. At high speeds, in addition, the momentum of the rider and bike becomes quite pronounced. As long as such momentum is maintained, driving or propelling the bike either at a constant speed or at a slowly but steadily increasing speed is not a great problem. However, if a slight upward incline or a slight headwind retards the rider, the accompanying loss in momentum may have a disastrous effect upon the power speed relationship.

In order to compensate for the large interrelated effects of grade, headwinds and inherent momentum at the high gear ratios sustainable by the average riders the present inventor has realized that it is necessary to have as many easily changeable gears as necessary to maintain a smooth speed of the bike with minimum hesitations or changes in speed or momentum. This aim is attained by having at least four sets of gears each with their own gear changer with a predetermined sequence of gear changing from lowest to highest, so that the speed and momentum of the bicycle can be easily attained in the first place and then maintained whatever the conditions. This requires the addition of at least one extra gear shaft and two sets of associated sprocket gears to the usual bicycle. More particularly an auxiliary gear shaft having at lest four small diameter gear sprockets on a single shaft plus at least three large gear sprockets on the same shaft is used to mediate power from the pedal sprockets to the drive sprockets of the bicycle.

Furthermore, since for maximum efficiency of the derailleurs it is desirable for the sprockets at both ends of a sprocket chain to be as far as conveniently possible from each other to decrease the angle of change of the chain between adjacent sprocket wheels or gears, it has been found that the most efficient placement of the extra sprocket wheel shaft and associated sprocket wheels will be within the frame of the bicycle just under or below the seat and toward the rear of the bike. This provides a strong well-positioned location where the sprockets are held rigidly in place, but spaced a reasonable distance from the sprockets on the drive wheel shaft and the sprockets on pedal shaft. Preferably this extra sprocket shaft with its two sets of auxiliary sprockets is mounted securely between two separate frame pieces of the bike frame. Two separate derailleurs are provided to change two separate sprocket chains between the various sprockets of each set of auxiliary sprocket wheels.

The present inventor has realized, therefore, that if carefully calculated and coordinated sets of gearing are provided on a bicycle including (a) a set of gears with a derailleur on the pedal cassette, or set of sprocket wheels, to change the bicycle chain from one sprocket to the other, (b) a set of gears on the drive wheel assembly in the form of a cassette, or set of sprocket wheels on the drive wheel with a derailleur to change the chains from one to the other and two sets of sprocket wheels or separate cassettes of gears on an auxiliary gear axle mounted on the center line of the bicycle close to the seat and toward the back of the bicycle and usually somewhat under and in back of the seat, each set of sprocket wheels or cassettes being supplied with their own derailleur, or gear changer, a very smooth operating bicycle with a very high top speed can be obtained. The principle embodied is that sufficient gears or sprocket wheels must be provided so that particularly at high speeds very smooth changing from one gear ratio to another must be available. The inventor has calculated that sufficient gear changing or derailleurs must be available so that not more than 5 foot pounds of force is necessary to maintain and increase speed at any point of the changing speed. More particularly the gearing should be such that only a single push or depression of the pedal is necessary to effect the next change in speed. With the illustrated arrangement this relative speed and power relationship is easily attained such that speeds of well over 120 miles per hour and up to 160 miles per hour are easily attained, although for safety reasons the rider will usually ride at lesser speeds. Furthermore, additional gear cassettes may be used to attain even higher speeds, which however, because of safety considerations may not be desirable. Once such elevated speeds are reached, preferably a set of gears will be used for careful maintenance of velocity and therefore momentum in which the individual sprockets of the set are relatively close together or matched in size so that relatively small adjustments in speed can be attained with relatively small changes in gear ratios.

The inventor is aware of the following prior art patents showing multiple gear bicycle systems and multiple derailleur or gearshifting mechanisms, but none of such systems disclose the present applicant's system.

U.S. Pat. No. 490,252 issued to A. D. Jenkins on Jan. 17, 1893, entitled "BICYCLE," discloses a bicycle having a pair of small sprocket wheels on the rear wheel, a pedal having a double sprocket arrangement, and one small, intermediate and inordinately large sprocket wheel situated on the bike frame generally in front of the pedal area. Jenkins is one of the earliest references disclosing a bike gear arrangement including more than two sprocket wheels situated to increase the speed of the cycle.

U.S. Pat. No. 520,796 issued to C. R. Mayne on Jun. 5, 1894, entitled "BICYCLE," discloses a cycle wherein the front and rear wheels have an inner rim on which "planet wheels" are made to circulate about a central axis. In FIG. 4, a pedal sprocket is secured to rear wheel sprocket by a chain, while a planet wheel is also geared to a further sprocket adjacent to the rear sprocket by a belt via a smaller wheel. While Mayne indicates that this is a form of speed gearing, exactly how such arrangement works is not immediately clear.

U.S. Pat. No. 559,299 issued to C. O. E. Matthern on Apr. 28, 1896, entitled "BICYCLE," discloses a two-wheeled velocipede having an intermediate sprocket or gear situated slightly behind and below the seat of the cycle. As shown in FIG. 2, the frame of the cycle has been adapted to hold such sprocket. As shown in FIG. 1, a chain extends between a pedal sprocket wheel and an upper sprocket, while a second chain extends between larger upper sprocket and a rear wheel sprocket. Matthern also provides that the pedal sprocket wheel can be driven directly on second rear wheel sprocket when normal pedaling speeds are desired.

U.S. Pat. No. 641,980 issued to W. W. Lower on Jan. 23, 1900, entitled "HIGH SPEED GEAR FOR BICYCLES," discloses another cycle having an intermediate gear arrangement. The Lower gear arrangement is different from the Matthern arrangement discussed above in that the intermediate sprocket is situated more or less directly above the pedal sprocket, rather than behind the rear seat.

U.S. Pat. No. 789,580 issued to W. Trainor on May 9, 1905, entitled "DRIVING GEAR FOR CYCLES," discloses an intermediate gear having sprockets which are essentially clamped to the downwardly extending frame member of the cycle. Trainor is directed to another means for attaching an intermediate sprocket to a bicycle.

U.S. Pat. No. 1,154,292 issued to T. J. Cribbs on Sep. 21, 1915, entitled "BICYCLE TRANSMISSION," discloses another intermediate gear or sprocket arrangement which extends upwardly from the standard gear sprocket and includes a smaller and larger sprocket wheel. Cribbs is unique in that the intermediate sprockets are secured to both the downwardly extending frame member and the horizontal frame member of the cycle. In addition, the Cribbs gear system apparently can be attached to a standard bicycle, thereby increasing the speed of such cycle.

U.S. Pat. No. 1,360,032 issued to E. and J. Schiffner on Nov. 23, 1920, entitled "BICYCLE GEARING," discloses an improved bicycle arrangement comprising an intermediate gearing connection between the pedal crankshaft and rear wheel of a bicycle so that the speed of the bike is increased for each given rotation of the pedal crankshaft without enlarging the sprocket wheel of such crankshaft. The Schiffner intermediate gearing connection includes a small and larger sprocket wheel so that a chain connects a pedal sprocket with the small sprocket wheel and chain connect the larger intermediate sprocket with the rear wheel sprocket. The speed of the rear wheel is therefore increased with each turn of the pedal crankshaft.

U.S. Pat. No. 1,380,082 issued to J. C. R. Schleder on May 31, 1921, entitled "BICYCLE," discloses another intermediate sprocket or gear arrangement which, as shown in FIG. 6, is clamped to the frame of the cycle in a slightly different manner. In Schleder, the intermediate gear is disposed nearer the rear wheel of the cycle, rather than directly above the pedal crankshaft or under the seat as in previous disclosures.

U.S. Pat. No. 1,535,714 issued to L. F. Burke on Apr. 28, 1925, entitled "BICYCLE GEARING," discloses a gear combination between the pedal shaft and the rear wheel. As indicated in column 1, lines 15–20, this is so that "the gear ratio of the bicycle can be increased without increasing the size of the crank shaft sprocket and thus decreasing the crank leverage." In addition, lines 39–40 of column 1 state "It has been suggested to use a double set of sprockets and two chains." Referring to FIG. 1, bike frame (10) includes two crankshafts, with the first crankshaft having pedals and large sprocket thereon. Second crankshaft includes a small sprocket and a larger sprocket. The rear wheel of the bike also includes a small sprocket. Chain connects pedal sprocket with small sprocket, while chain connects sprocket (15) with rear wheel sprocket. Apparently, bike frame diagonal member may be pivotable at a point just below the seat. In addition, a horizontal member is apparently adjustable so that the tightness of one of the chains can be adjusted without the other chain becoming loosened as in prior art arrangements.

U.S. Pat. No. 1,630,442 issued to G. Makris on May 31, 1927, entitled "BICYCLE," discloses a bicycle having two, rather than one, intermediate sprocket wheels. Makris essentially uses two rather than one intermediate so that the speed of the bicycle is increased a further multiple which is dependent upon the exact gear ratios of the sprockets.

U.S. Pat. No. 3,921,467 issued to H. Matsuura on Nov. 25, 1975, entitled "DRIVE SYSTEM FOR CYCLE," discloses another gearing system which includes an intermediate sprocket arrangement. Primary sprocket includes pedals on crankshafts, while rear sprocket is secured to the rear wheel of the cycle. Intermediate sprockets are situated so that primary chain extends between primary sprocket and smaller intermediate sprocket, while second chain extends between larger intermediate sprocket and rear sprocket. Matsuura generally teaches the use of a secondary or intermediate sprocket or gear system to increase the speed of the bike. The main inventive feature of Matsuura appears to be the addition of tensioner sprockets which are used to guide or position primary chain.

U.S. Pat. No. 4,173,154 issued to N. E. Sawmiller et al. on Nov. 6, 1979, entitled "BICYCLE DRIVE SPROCKET SYSTEM," discloses an alternative pedal drive arrangement wherein the pedal sprocket is actually comprised of a pair of sprockets secured together by a chain. Such combination is used to give the pedals an oval pedal path, which Sawmiller claims increases the power and speed of the cycle. Sawmiller therefore does not actually disclose an intermediate sprocket, but a pair of sprockets comprising the pedal sprocket, rather than the standard single crankshaft and sprocket.

U.S. Pat. No. 4,502,705 issued to J. B. Weaver on Mar. 5, 1985, entitled "SEMIRECUMBENT TANDEM BICYCLE," discloses another cycle arrangement which utilizes several chains and gears or sprockets to apparently increase the speed of the cycle. The position of the front pedal sprocket and crankshaft can be changed, as shown in FIG. 1. However, the cycle can also be pedaled using standard crankshaft, so that the cycle can be ridden in either an upright or semi-recumbent position.

U.S. Pat. No. 4,826,191 issued to D. A. Matre et al. on May 2, 1989, entitled "BICYCLE OR TRICYCLE," discloses a bike wherein the position of the pedal sprocket is adjustable. As shown in FIG. 2, the bike includes second, third, and fourth sprockets. The second sprocket connected and positioned near the pedal sprocket, the third sprocket is positioned adjacent the second sprocket, and the fourth sprocket is on the rear wheel. In the disclosed gear system the intermediate sprockets are preferably the same size, with the main purpose of the invention appearing to be the adjustability of the pedal sprocket rather than producing faster speeds. However, lines 53–56 of column 2 indicate that the rotational speed of the rear wheel can be modified by "replacing the sprocket [the third sprocket] with one having a different size.

U.S. Pat. No. 5,102,155 issued to T. Chou on Apr. 7, 1992, entitled "BICYCLE WITH TWO SPEED-CHANGING MECHANISMS," discloses another intermediate sprocket system for increasing the speed of a bicycle. Chou includes both a small and large intermediate sprocket. Of note is the fact that the smaller intermediate sprocket has a smaller radius than the pedal sprocket, while the larger intermediate sprocket has a larger radius than the pedal sprocket. A bracket is also provided in the frame of the bike for holding the intermediate sprocket system just behind the pedal sprocket and crankshaft.

U.S. Pat. No. 5,209,507 issued to A. Domenge on May 11, 1993, entitled "TRANSMISSION SYSTEM FOR TANDEM BICYCLES," discloses, as best shown in FIG. 2, a transmission or gear system having an intermediate gear with a larger and smaller sprocket thereon. The Domenge system includes an intermediate sprocket with a crankshaft and pedals so that two persons can ride and pedal the bike at the same time. FIG. 12 discloses another embodiment wherein a third seat and crankshaft is added behind the rear wheel.

U.S. Pat. No. 5,577,749 issued to T. Ross on Nov. 26, 1996, entitled "TWIN GEAR DRIVE ASSEMBLY FOR A BICYCLE," discloses another bicycle having a third or intermediate gear assembly for increasing the speed of the cycle without increasing the effort required by the user.

U.S. Pat. No. 5,913,741 issued to J. P. Balajadia on Jun. 22, 1999, entitled "BICYCLE WITH THREE BOTTOM BRACKET SHELLS AND GEARING SYSTEM," discloses, as shown in FIG. 8, a bike frame having a pair of intermediate gear arrangements each having one larger and one smaller chain sprocket thereon. Three chains are utilized in the Balajadia system, rather than two.

U.S. Pat. No. 5,979,924 issued to C. P. D'Aluisio on Nov. 9, 1999, entitled "CRANK ASSEMBLY FOR A BICYCLE," discloses, as shown in the FIGS., a plurality of intermediate sprockets each having separate chains which are generally situated around the pedal crankshaft area of the bike. 0' Aluisio is an example of the current state of the art in cycle having a plurality of sprockets so that the overall wheel speed of the cycle is significantly increased. 0' Aluisio also includes a good discussion of the theory behind such speed increase in the "Background" section, as well as several charts in columns 10–12 discussing the differences between various gear sizes. The 0' Aluisio system is also designed for use on a mountain bike having a full-suspension, rather than a road bike.

U.S. Pat. No. 6,347,803 issued to O. L. Berges on Feb. 19, 2002, entitled "BICYCLE WITH TWO CHAIN DRIVEN DIFFERENTIALS" discloses another state of the art bike transmission or gear system having more than the standard pedal and rear tire sprocket arrangement.

None of the above cited references disclose or suggest the arrangement of the present inventor therefore provides a system by the use of which a very high speed may be attained on a bicycle with minimum effort.

OBJECTS OF THE INVENTION

It is an object of the invention to provide a bicycle that can attain a very high speed.

It is a further object of the invention to provide a bicycle adapted to enable the average rider in particular to attain very high bicycle velocities.

It is a still further object of the invention to provide a bicycle having multiple gear cassettes (including alternative cogwheels for interaction with a power transmission chain and a gear changer, or derailleur) that can be operated in a smooth sequence without interruption in pedal powering of the bike.

It is a still further object of the invention to provide a power system for a bicycle having at least four separate gear cassettes or gear sequences, each with a gear changer capable of being operated by the rider in a uniform sequence to attain a smooth transition in force transferred from the pedals of the bike to the drive wheel or wheels.

It is a still further object of the invention to provide a high velocity bicycle gearing system in which the gear changing system is coordinated to provide a smooth essentially uninterrupted or seamless transition of pedal force from a lower speed to a high speed as well as reverse downgrading of force.

It is a still further object of the invention to provide a high velocity bicycle for the average rider which bicycle has multiple gearshifts on the handle bars closely spaced to afford easy operation in sequence of said gearshifts in a uniform sequence.

Other objects and advantages of the invention will become evident from review of the following description in combination with the appended drawings and illustrations in which similar reference numerals designate the same structures in the various figures.

SUMMARY OF THE INVENTION

A high velocity bicycle is provided for the average rider having at least four sets of sprocket gears and associated drive chains together with a gear changing mechanism for each set of sprocket gears with the gear ratio of each set of gears being arranged to provide a smooth sequence from one gear to another and with the gear changing controls arranged for a smooth progression from one gear ratio to the next, two of the extra or auxiliary sets of gears being positioned in the frame of the bicycle near to and below the rider's seat near the rear of the bicycle. One or more additional sets of sprocket gears with associated gear changing mechanism may be positioned to the rear of the additional two sets of sprocket gears in order either to provide a smoother changing of gears or to extend the already elevated velocity attainable with the two extra or additional sets of gears.

DETAILED DESCRIPTION OF THE PREFERRED EMBODIMENTS

Figure 1:
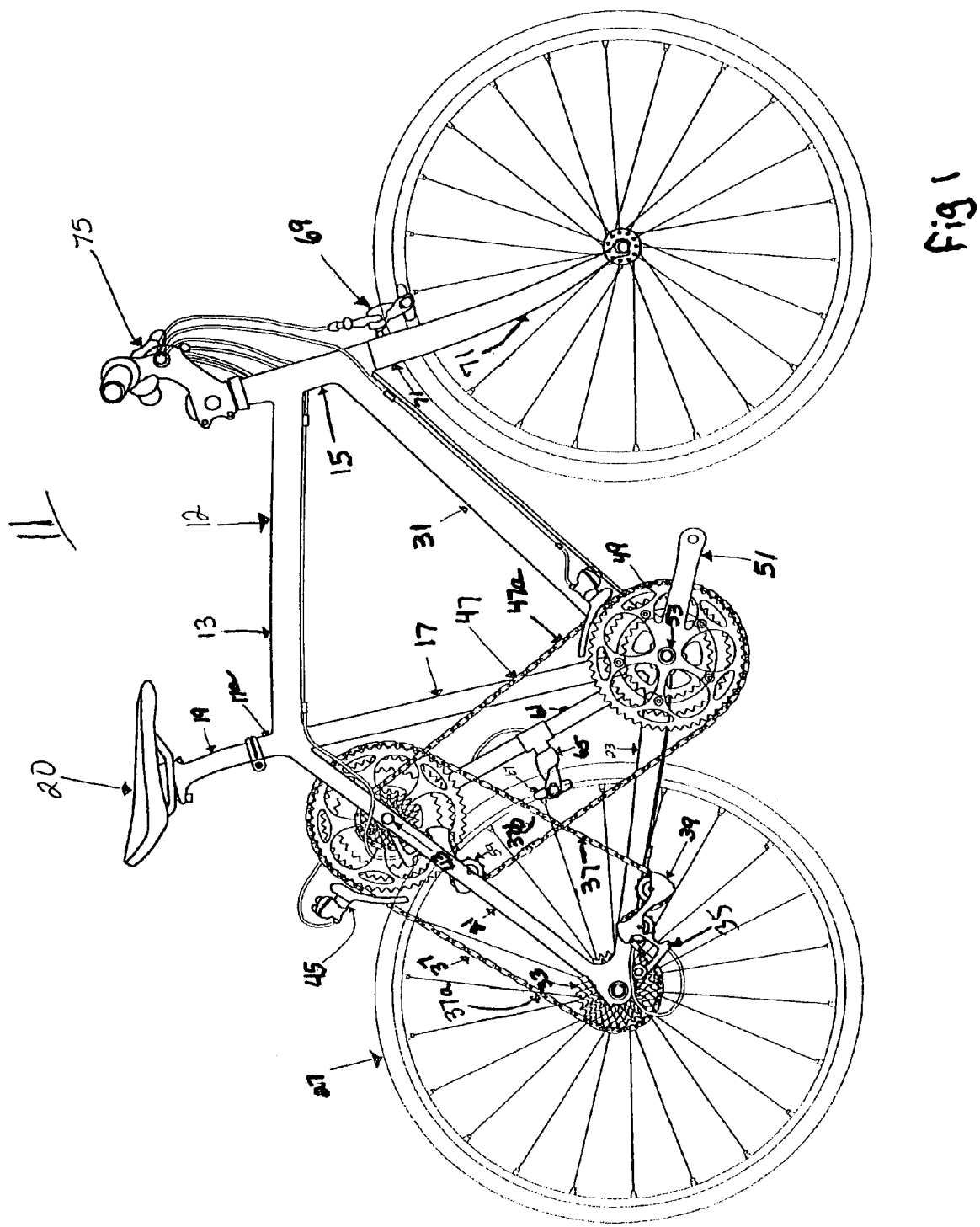
FIG. 1 is an elevation or side view of a bicycle in accordance with the invention.
Figure 2:
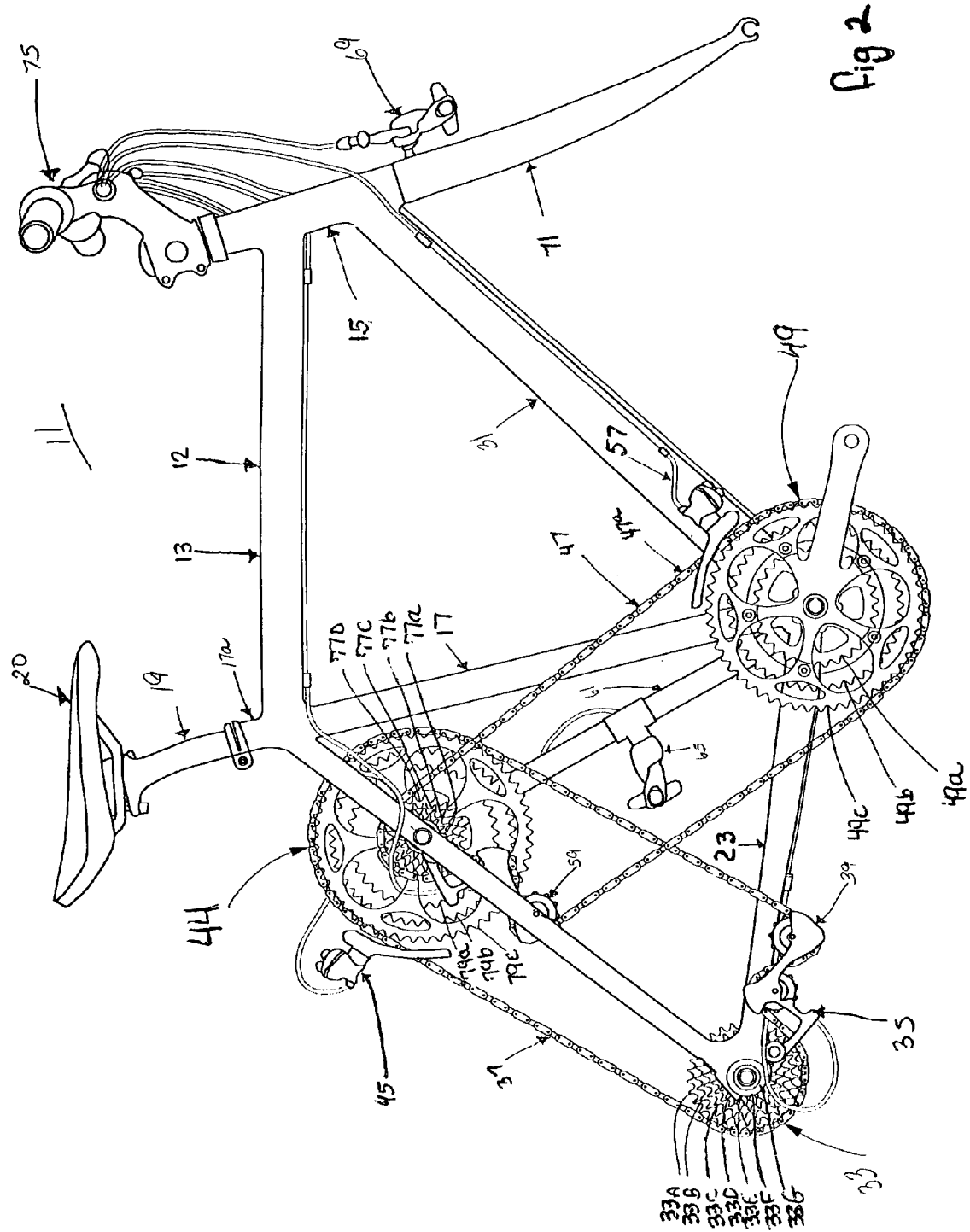
FIG. 2 is an elevation of the frame and associated appurtenances on the frame, but with the wheels removed showing the operational portion of the bicycle in larger or greater detail.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

The present inventor has designed a practical high velocity bicycle for the average bike rider by combining at least four separate sprocket gear groups or cassettes, two of said groups of gears being in an auxiliary gear assembly, with the third being at the front and the fourth at the rear of the bicycle, each group of gears being provided with its own derailleur of a type which allows or requires the drive chain to be transferred at will from one sprocket of the separate but associated group of sprockets to an adjacent sprocket gear of the same group while the gears are moving, whereby the force on the pedals can be maintained at a level easily attainable by the average rider and the various gearing combinations kept within the capacity of the average cyclist regardless of changes in road or trail and particularly surface inclination as well as air flow or headwind conditions so that momentum of the bicycle and rider is not changed substantially, particularly at elevated velocities of the bicycle, enabling the average cyclist to maintain an easily attainable force upon the pedals at all times even as the atmospheric and inclination conditions vary.

The present inventor has realized that the limit in speed of movement or travel of a bicycle along the ground surface for the average rider is the significant changes in force necessary to maintain either a uniform velocity or a progressively increasing velocity in the face of changing inclinations of the surface over which the bicycle is moving as well as changes in effective headwind velocity, which changes can fairly drastically change the momentum of the bicycle and rider combined and lead overall to inability to comfortably reach elevated speeds. Effective headwind velocity is the additive velocity of the headwind created by the movement of the bicycle and rider through the atmosphere as modified by the strength and direction of whatever the actual wind conditions are. If the current atmospheric wind is contrary to the movement of the bicycle and rider, the effective headwind is increased, sometimes rather suddenly, particularly in gusty conditions, at high velocities. However, with the gear ratio relatively low, i.e. without significant leverage provided by the gears themselves, but depending mainly upon the leverage provided by the length of the bicycle pedals, a sudden increase in combined headwind can, unless compensated for essentially immediately and preferably instantaneously, retard the movement of the bicycle with a resultant large loss in momentum that will outpace the ability of the average rider's legs to compensate by applying extra muscle force, resulting in an even greater loss in speed and momentum. Unless the gear ratio of a high speed bicycle can be very rapidly and effectively changed, therefore, in fairly small increments, the resistance of the pedals to pedaling can change so rapidly and other than proportionally in the force required to maintain velocity as to completely overwhelm the everyday bicycle rider, even though it may not be completely overwhelming to an experienced bicycle racer or marathon cyclist. A change in inclination of the riding surface or in headwind conditions, which, even if it only momentarily retards a bicycle traveling at a high velocity where the gear ratio between a reasonable force on the pedals easily applied by the average rider with a sufficient gear up ratio to attain very elevated velocities can combined with a change in combined momentum of the bicycle and rider cause a very rapid change in force necessary on the pedals to maintain velocity which can quickly overwhelm the average rider or even a professional rider. On the other hand, if the momentum of the rider and bicycle combined can be maintained, then the only extra force is that due to the actual retarding incline or headwind itself and, as a result, the high initial velocity can be maintained by reasonable force applied to the pedals. Analyzing the problem, the present inventor has realized that the difficulty can be overcome by providing sufficient gear changing capacity plus quick change gears so the power applied by the pedals of the bicycle can be quickly altered or changed so that no significant change in velocity is had with changing conditions, momentum does not drop precipitously and the high speed can be effectively maintained in the face of many small retarding influences. The present inventor has, as noted above, found that at a minimum, two additional gear changing cassettes, or sets of gears, together with two additional gear changing mechanisms, or derailleurs, are necessary to both attain very high velocities and to effectively maintain constant or constantly increasing speed. Additional gear changing ability can be provided by providing additional gear combinations. However, the present inventor has found that two extra sets of gearing on opposite ends of a rigidly held shaft placed at a location just below and somewhat behind the seat of a bicycle, with each gear combination being provided with its own derailleur, is sufficient to provide the control of speed and momentum necessary for the average rider to attain very elevated speeds in the range of as much as 120 to 160 miles per hour, which is about as high as the average bicycle frame and wheels can safely endure.

In FIG. 1 there is shown an elevation of a bicycle 11 embodying the present invention in which the usual sturdy central frame is comprised of a triangular central frame section 12 comprised of a top bar 13 extending between a hollow forward steering assembly 15 and a seat support bar 17 which extends slightly above the top bar or frame member 13 as extension 17a into the top or upper portion of which extends the seat support bar 19 of seat 20. Extending rearwardly from the top section of seat support bar 17 is upper wheel frame 21 and lower wheel support bar 23 which join at the rear wheel support section or frame 25. As known to those skilled in the art, the lower wheel support bar 23 and upper wheel frame 21 are split into two or double members as illustrated in isometric view in FIG. 3, which allows the rear bicycle wheel 27 to be mounted upon its axed 29 between such frame members and also allows the individual components 21a and 21b and 23a and 23b of both members 21 and 23 to be smaller than the other main frame members, top bar 13, seat support bar 17, and pedal support bar 31.

Figure 3:
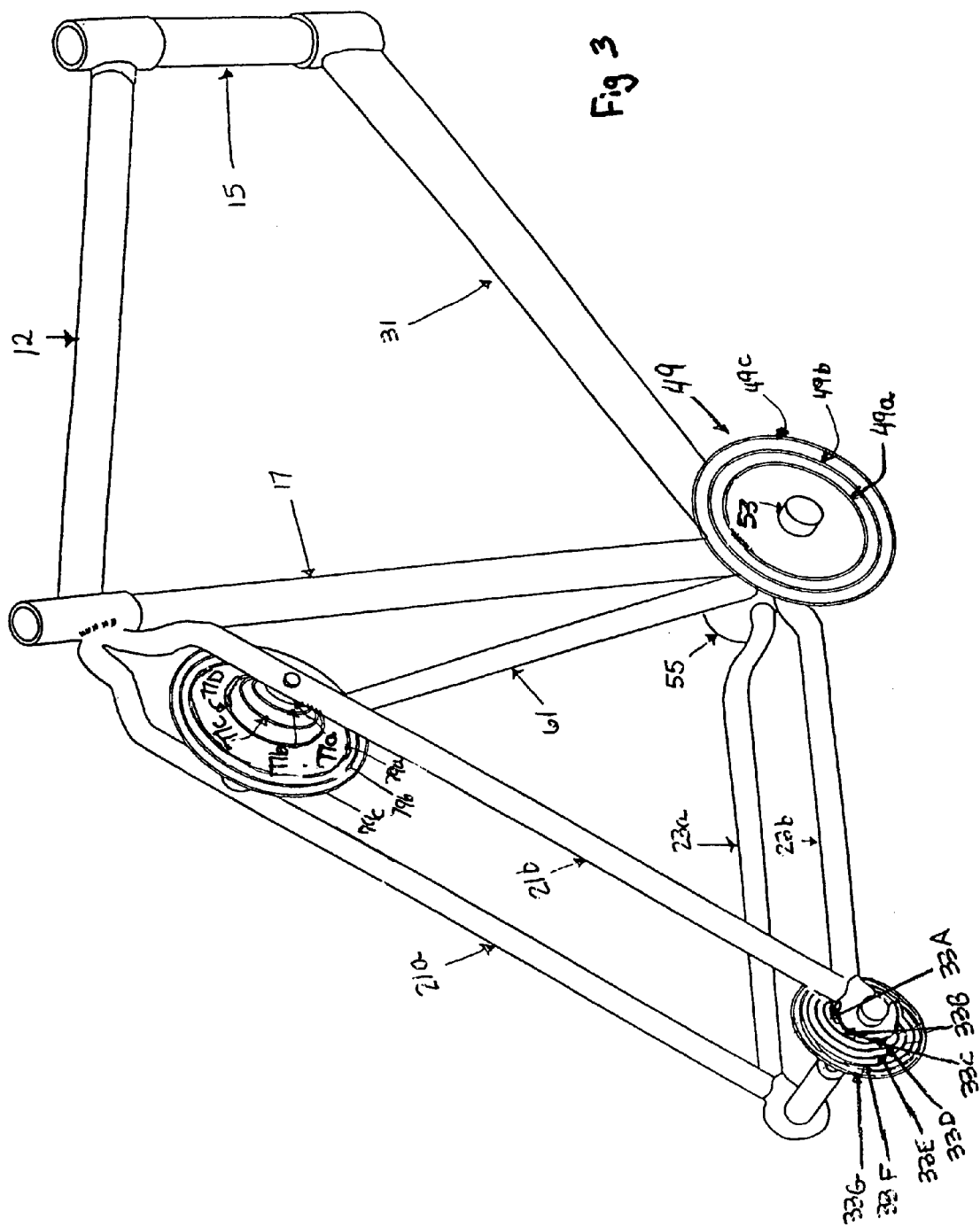
FIG. 3 is an isometric diagrammatic view of the frame of the bicycle of the invention with the sprockets shown diagrammatically to illustrate the frame and sprocket relations of the bicycle with the sprockets illustrated for simplicity and clarity of explanation without sprocket teeth or chain connections.
Figure 4:
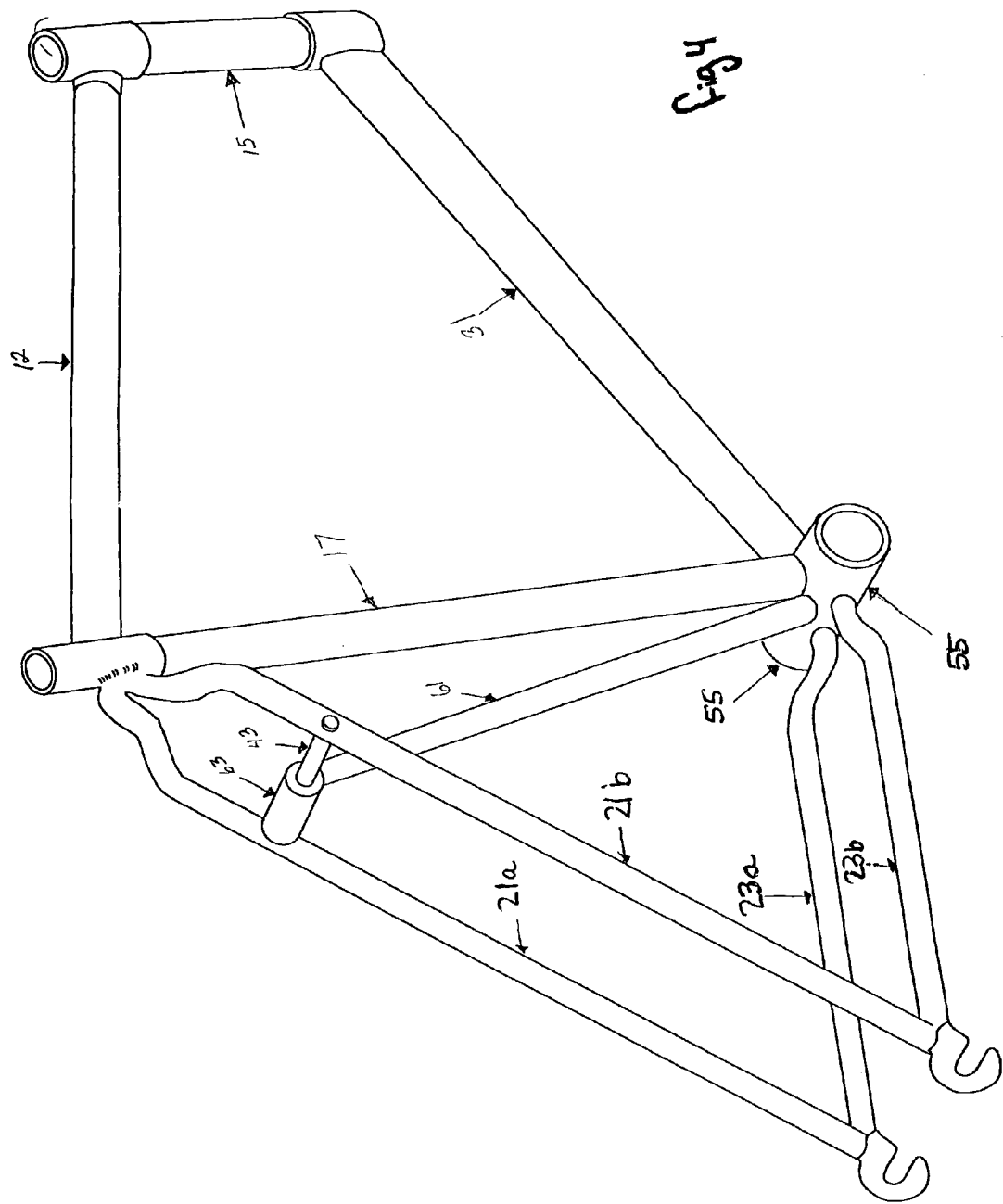
FIG. 4 is an isometric view of the frame of the bicycle of the invention with all moving parts removed to better show the supporting frame.
Figure 5:
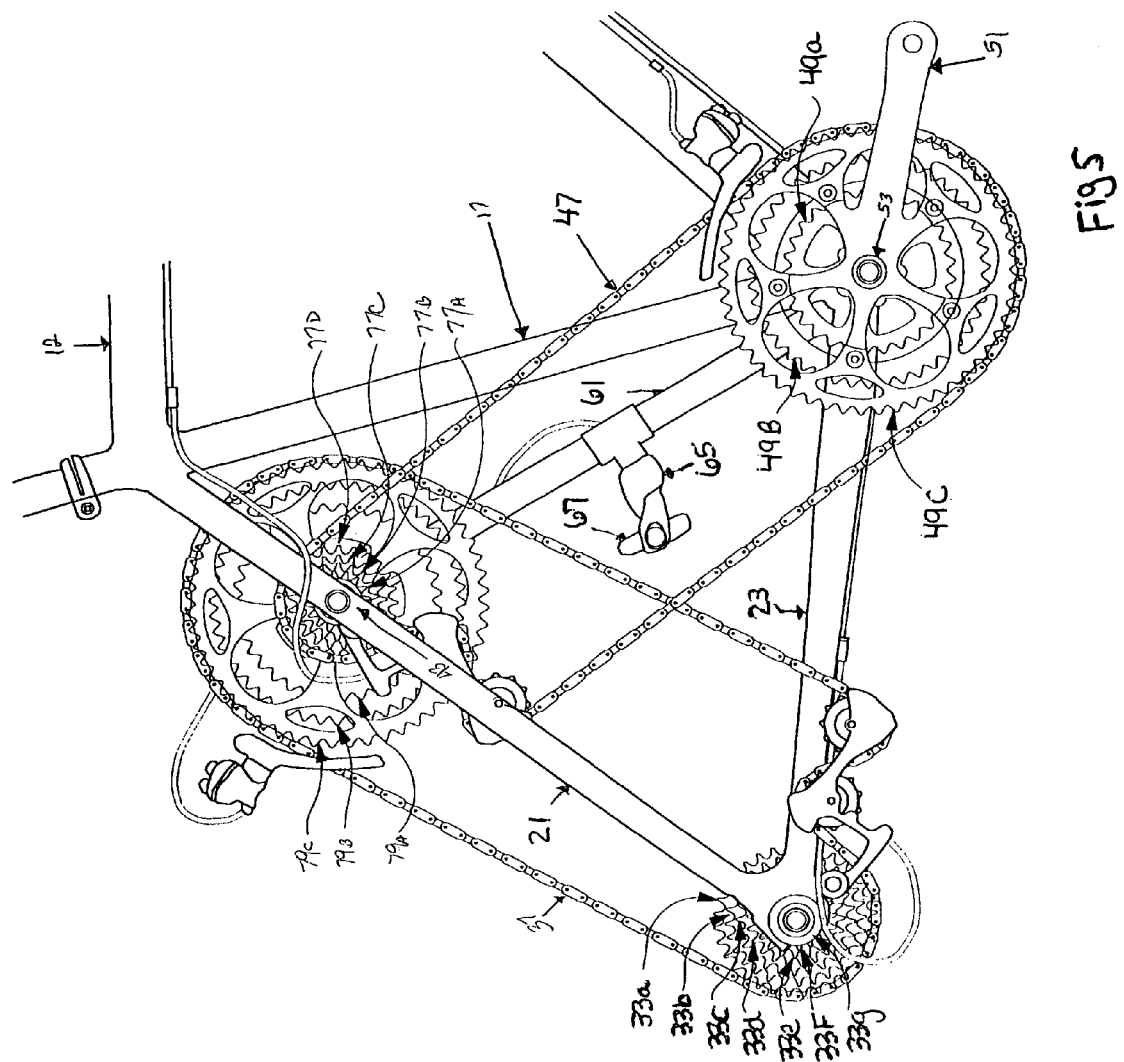
FIG. 5 is an elevation of the rear and central portion of the bicycle of the invention with the back wheel removed to better show the relationship of details of the invention in larger scale.

The rear axle 29, as known in the art, supports in addition to the rear bicycle wheel 27 a series of sprocket wheels or gears, in this case seven (7) sprocket gears 33, individually designated 33a, 33b, 33c, 33d, 33e, 33f and 33g of regularly increasing diameter, see FIG. 3. Also present is a rear derailleur 35 which serves, as known in the art, to transfer the bike chain or drive chain 37 from one to the other of the sprocket gears 33a–33g depending upon the gear ratio desired in combination with operation of the other gear changers. As will be understood, the sprocket gears 33a–33g are fixed to the rear bicycle wheel 27 usually with spacers, not shown, between the various sprockets to provide room for the sprocket chain or drive chain 37 to extend over the sprocket teeth. The derailleur 35 has associated with it a conventional spring mounted slack take-up arm and pulley 39 on the off side of the drive chain, i.e. the portion of the chain 37 which is least tensioned in forward movement of the bicycle. For example as shown in FIG. 1.

An auxiliary group or set 44 of sprocket gears 44 comprised of small sprocket gears 77, namely gears 77a, 77b, 77c and 77d and large gears 79, namely gears 79a, 79b and 79c are provided between frame components 21a and 21b. Sprocket chain 37 extends from the large set of gears 79 to sprockets 33 and sprocket chain 47 extends from auxiliary sprockets 77 to drive sprockets 49.

The rear portion 37a of chain 37 has drive tension in it extending from the rotation of sprocket wheels 79 being the largest auxiliary set of gears from assembly 44 and through that tension turns the sprockets 33. This leaves the portion of the chain 37b which is merely returning from sprockets 41 to sprockets 33 with less tension and in which slack is maintained for use in passing over sprockets of varying diameters both in sprockets 44 and 33. The slack take-up apparatus 39 thus serves by spring tension to take-up slack in the chain created by the passage of the chain upon changing from a larger to a smaller sprocket gear and reversely pays out slack against spring tension when the chain passes from a smaller to a larger sprocket gear, all as well recognized in the art. Such spring tension arm, or chain slack take-up, serves to maintain correct tension in the sprocket chain, in the sprocket gears, and with respect to both changing from one to the other of the various sprocket gears 33a–33g, but also with respect to sprocket gears 44 which are mounted upon intermediate drive axle 43 and provided with a derailleur 45.

A second drive chain 47, as noted above, or second portion of the combined drive chain arrangement 37 and 47, passes from the pedal sprocket assembly 49 where as seen in FIG. 3 a group or cassette of sprocket gears of varying sizes are driven by the two usual pedals 51, only one of which is shown in FIG. 1 as well as the other figures. It will be understood that the other pedal is hidden behind the lower support bar 23. The actual pedal 51a is shown as a simple round shaft, upon which, as well known in the art, an actual rotary foot pedal, not shown, may be journaled. The pedal sprocket assembly is, as indicated, formed of three sprocket gears 49a, 49b and 49c mounted upon axle 53 which is journaled in pedal support journal 55, better shown in FIG. 3. The pedal sprocket assembly or cassette 49 is provided with its own derailleur 57 which serves to change the position or interengagement of the drive chain between the various sprocket gears 49a, 49b and 49c of the gear assembly or cassette 49. The section 47a of the second drive chain section 47 is the tension side during forward movement of the bicycle so that a slack take-up 59 is positioned on the opposite side as known to those skilled in the art to take up slack and pay out slack in the chain 47 as a result of alteration of the interengagement of the chain 47 with the various sprocket gears of the pedal assembly and the pedal side of the auxiliary sprocket gear assembly 44. It will be noted in the figures that the largest sprocket 49c of the pedal sprocket assembly is integrally secured to or alternatively actually integral with the pedal 51, the pedal being bent outwardly to clear the chain 47 when passing of the pedal sprocket assembly is integrally secured to or alternatively actually integral with the pedal 51, the pedal being bent outwardly to clear the chain 47 when passing about the sprocket gear 49c.

A reinforcing bar 61 extends from the pedal support journal 55 to the auxiliary axle 43. A support or connecting journal member 63 integrally secured to the reinforcing bar 61 surrounds approximately half of the rotatable auxiliary axle 63 both stiffening or bracing such axle as well as spacing the auxiliary gear assembly to one side so that the appropriate sprocket gears are lined up with the drive sprocket gears 33. The reinforcing bar 61 also serves as a support for placement and support of a caliper type brake 65 the brake pads 67 of which contact opposite portions of the rim of the wheel 27. A second caliper brake 69 is supported from the front wheel clevis support 71 as known to those skilled in the art. The clevis support 71 has the front wheel 73 of the bicycle journaled to its lower end and is laterally rotatable through the steering shaft, not shown, passing through the forward steering assembly 15 and turned by means of the handle bars 75 attached at the upper end.

As best illustrated diagrammatically in FIG. 3, the auxiliary axle 43 has rotatably mounted thereupon the auxiliary sprocket gear assemblies 44. These two assemblies, as noted above, each comprise a cassette or group of three and four respectively interconnected sprocket wheels. The smaller sized group 77 is comprised of four sprocket gears 77a, 77b, 77c and 77d of progressively larger size. These sprocket gears are attached or secured to the auxiliary axle 43 and receive the sprocket chain 47 extending upwardly from the pedal sprockets. The second group of auxiliary sprockets 79 are larger and comprise sprocket gears 79a, 79b and 79c again in ascending order of size. These sprocket gears are also mounted upon and secured to the auxiliary axle 43 and receive the sprocket chain 37 from the rear or drive wheel sprocket gears 33. Auxiliary sprocket gear groups or cassettes serve to transfer pedal power received from the pedal sprockets 49 via sprocket chain 47 to small sprockets 77 via the auxiliary axle 43 to the large sprockets 79 from whence the power or force is transferred to the rear drive wheel sprockets. As will be noted, the relatively larger pedal sprocket gears 49 are connected to the relatively smaller auxiliary sprocket gears 77 so that a single turn of the pedal sprockets will cause multiple revolutions of the small auxiliary sprockets 77, the exact differential of rotation depending upon the relative sizes of the two sets of gears. This rotational velocity is transferred into the auxiliary axle and causes an equal number of revolutions in the large set of sprocket gears 79 which is then transferred via the sprocket chain 37 to the relatively smaller sprocket gears 33. Thus for each rotation of a first sprocket gear, the next gear rotates an increased number of rotations or turns and an increased rotational velocity or number of turns is provided to the next sprocket gear in the sequence. Furthermore, since there are multiple sprockets in each group the relative number of rotations can be adjusted by changing the sprocket chain from one to the next sized gear. Since there are a number of combinations of gears a large number of gear combinations can be made up so that the power can be easily adjusted up or down by discrete changes of the sprocket gears over which a sprocket chain is placed.

As an example, if the pedal gear assembly (which is assembly 49) is designated as A, the small rear gear assembly 33 is designated B, the auxiliary small gear assembly 77 is designated C and the auxiliary large gear assembly 79 is designated D, the tension and force in the chain drive will flow from A to C and then from D to B.

Since it has been found by the inventor, as explained above, that it is very important and, in fact, critical to maintain momentum at very high gear ratios, else the effort necessary to pedal is beyond the capability or desire of the average bicycle rider, it is very important that a way to quickly change gear ratios in relatively small increments must be available so the speed and momentum of the bicycle is not always changing, or more correctly that small negative changes in speed and momentum can be quickly and accurately compensated for before they become major impediments to continuing. This is provided by not only having very high gear ratios or multiplications of the rotation of the pedals by the time the rotation is transferred into rotations of the wheels or more especially the drive wheels of the bicycle which are themselves fairly large so that a single turn of the pedals may translate into multiple turns of the bicycle wheels, but particularly in the upper portions of the speed range or high gear ratio range, quick changing or adjustment of the gear ratio is necessary to prevent sudden multiplication of the force necessary to maintain the speed of the bicycle. Furthermore, such quick adjustments in gear ratio should be fairly small so that the speed can be fine tuned so to speak and maintained at a uniform speed or slowly increasing speed. While the ability to make minor adjustments of the gearing is in accordance with the present invention particularly important at high speeds, as a practical matter this can be taken care of by having a number of attainable gear ratios, since various routes to any given speed or gearing ratio can be taken as long as there is the ability to change each gearing ratio. The present inventor has found that at a minimum there should be in order to practice the invention at least four interconnected sprocket gear groupings each having at least three sprocket wheels for interengagement through a sprocket chain with adjacent sets of sprocket wheels. In the embodiment of the invention shown in the figures the last or drive sprocket grouping has four sprockets providing slightly more flexibility. These sprockets are also more closely matched in size. Thus at high speeds changes in gear ratio by use of these four gears is preferred as a form of fine tuning which prevents loss of momentum at any time. It is necessary, of course, for there to be a derailleur associated with and available to change the drive sprocket chain associated with each set of three or more sprocket gears. The four derailleurs must be of the type that can be operated and in fact requires operation while the gears and chains are moving and in interengagement for driving the bicycle.

Since in order to maintain speed and momentum in the face of an increase in either effective headwind or increase in grade or both, the gearing ratio must be dropped back slightly, essentially any of the gear ratios can be adjusted so that the control, usually provided on the handle bars, can be adjusted to decrease the gear ratio by decreasing the size of drive gear sprocket, i.e. a sprocket which is placing power or force into the sprocket chain, or by increasing the size of the sprocket which is driven by a sprocket chain, thus, in either event decreasing the number of final revolutions of the drive for the number of revolutions of the pedal sprocket assembly. The speeds of the bicycle can be adjusted anytime from any set of sprocket wheels 33a–33g with derailleur 35 or with sprocket wheels 49a–49c with derailleur 57 or auxiliary set 44, consisting of small 77a–77d with derailleur 59 auxiliary set 44, consisting of large 79a–79c with derailleur 45, all of which are controlled from the handlebar.

The auxiliary gear arrangement 44 mounted below and just to the rear of the seat 20 in its overall function in effect multiplies the number of revolutions of the drive wheel 27 attainable by or from one revolution of the pedals. If the largest sprocket gear on the pedal assembly is engaged with the chain and has 52 teeth and a diameter of 21 centimeters and this is connected by the sprocket chain with a smaller sprocket having 18 teeth and a 7 centimeter diameter connected directly with the rear drive wheel for every rotation of the pedals the rear drive wheel will rotate approximately three times for every rotation of the pedals. How far or fast the bicycle will go then will depend upon the circumference of the drive wheel. This is a fairly normal ratio for standard bicycles. If an auxiliary set of sprocket gears is added, however, and the initial sprocket chain extends, to the same sized small sprocket on the auxiliary axle 43, i.e. to an 18 tooth 7 centimeter sprocket wheel, the auxiliary axle will turn three times for every rotation of the pedals. If there is a similar 52 tooth 21 cm diameter sprocket on the same axle this sprocket will also turn or rotate three times for each rotation of the pedal sprockets. However, when a sprocket chain 37 now extends backward from this large sprocket to a smaller sprocket on the or associated with the rear drive wheel having a diameter of 7 centimeters and having 18 teeth, such small sprocket and the drive wheel itself will rotate three times for every rotation of the auxiliary sprocket so there is a combined gear advantage of three times three or nine times the number of turns of the pedals. Assuming a bicycle wheel diameter of 30 inches this comes to approximately 60 feet which assuming four pedal turns per minute equals 240 feet/minute or any multiple thereof. This is a fairly high gear ratio which at higher speeds places considerable strain upon the legs. Thus, in order to allow for quick adjustment of the force required by the legs to quickly compensate for any opposing forces, it is necessary to have a number of quickly attainable alternative gear ratios with lower gear ratios. This is provided in the present invention by having one derailleur for each set of gears. In accordance with the invention it is desirable if one can achieve a standard speed before shifting to a higher speed and the above speed may be considered a standard speed with the auxiliary assembly placed on the bike.

Figure 6:
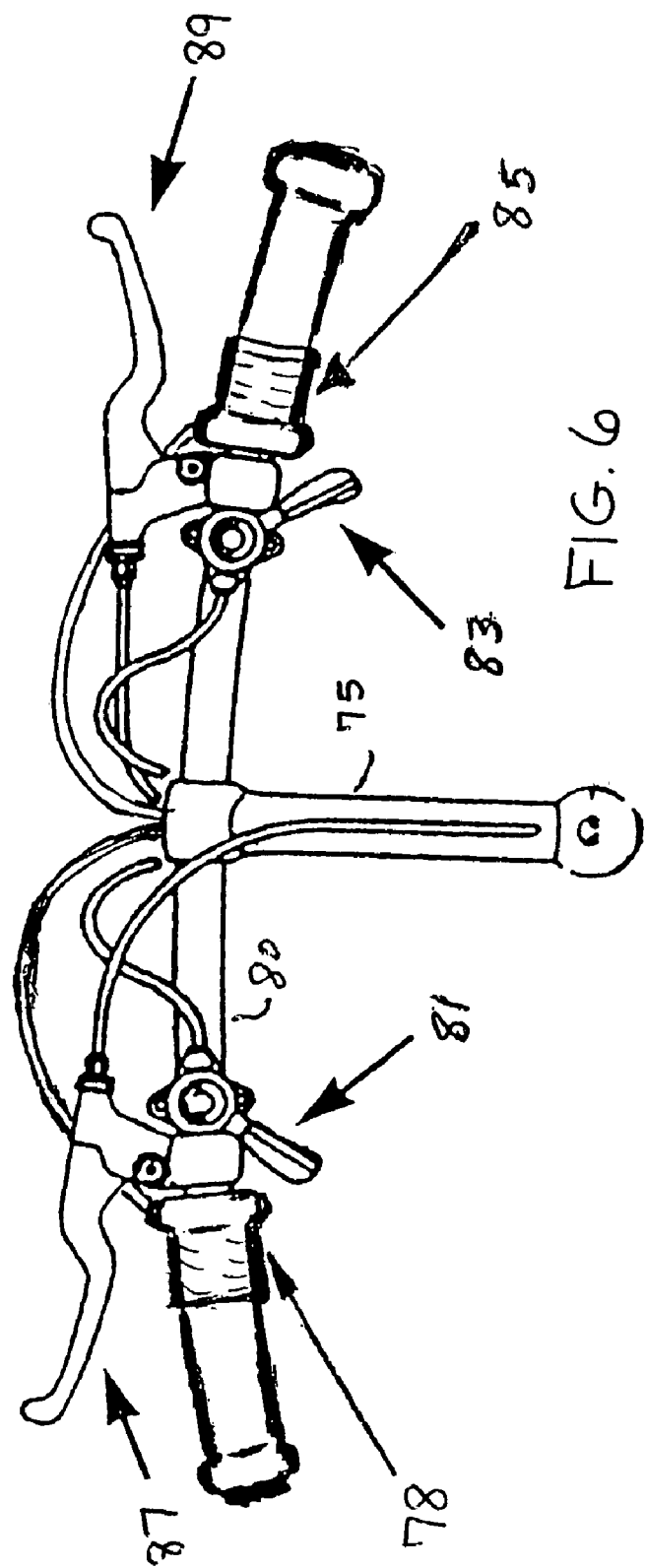
FIG. 6 is a top view of the handle bar of the bicycle showing the preferred arrangement of the gearshift control means.

FIG. 6 is a top view of handlebar assembly 75 of the bicycle shown in FIG. 1 showing a preferred arrangement of the derailleur controls. Such controls are mounted upon the crosspiece 80 of the handlebar and comprise four individual controls 78, 81, 83 and 85. Controls 78 and 85 are more or less conventional rotary type controls for the large auxiliary shifter or derailleur 45 and the small auxiliary shifter or derailleur 58 respectively, while lever controls 81 and 83 are lever type shifter controls for the front shifter 57 and rear shifter 35 respectively. This arrangement retains the right side controls for relatively fine monitoring by the right hand of right handed riders and the left hand for relatively less critical monitoring of the remaining controls. It may be desired to reserve the rotary right hand control for whatever shifter or derailleur provides the control for the relatively smallest changes in gearing ratio in order to provide the finest or most changes for control at higher velocities when it is most critical to control the power provided to the wheels of the bicycle.

In order for the rider of the bike not to be overwhelmed with numerous gears to be changed and with the new speed in the beginning, it may be desirable to use more sprockets in the auxiliary assembly then by taking the smallest of sprockets 79 and the largest of sprockets 77. One will have achieved the most desired speed. For slower speed one may go back to the shifting of the pedal gear and use the smallest of pedal gear 49 and the biggest in rear gear 33 at the beginning and then shifting the gear to the highest speed when needed.

The many speeds on the bike may be calculated as follows:

1. If one calculates the pedal gear as having 3 different sprockets and the auxiliary assembly as having a set of sprockets which will be three big sprockets and four small sprockets and on the rear drive, 7 different sprockets, then by calculation there will be 252 speeds.

2. If one calculates the pedal gear as having 4 different sprockets and the auxiliary assembly as having a set of sprockets which will be three big sprockets and four small sprockets and on the rear drive, 7 different sprockets, then by calculation there will be 336 speeds.

One could obtain very many more speeds. This is probably not necessary at this time, however:

3. If one calculates the pedal gear as having 4 different sprockets and the auxiliary assembly as having a set of sprockets including three big sprockets and five small sprockets and on the rear drive 8 different sprockets, then by calculation there will be 480 speeds.

There can even be many more speeds by adding more sprockets. Where the particular number of sprockets on the sprocket wheels are referred to above, these should be considered only as examples.

While the present invention has been described at some length and with some particularity with respect to the several described embodiments, it is not intended that it should be limited to any such particulars or embodiments or any particular embodiment, and is to be construed with reference to the appended claims so as to provide the broadest possible interpretation of such claims in view of the prior art and, therefore, to effectively encompass the intended scope of the invention.

I claim:

1. A drive arrangement for a bicycle having multiple sets of sprocket wheels comprising:
   (a) a first sprocket assembly including a pair of foot operated pedals and a set of adjacent chain sprockets connected thereto via a shaft rotatably mounted in a journal in a bicycle frame said sprocket assembly being comprised of at least three adjacent differentially sized relatively large sprocket wheels,
   (b) a second sprocket assembly connected to a rear drive wheel assembly said second sprocket assembly including a set of at least three adjacent differentially sized sprocket wheels substantially smaller in diameter than the sprocket wheels of the first sprocket assembly,
   (c) an intermediate auxiliary gear arrangement assembly mounted in a central position close to and at least partially under a seat for a rider of the bicycle having third and fourth assemblies of adjacent sprocket wheels mounted upon a rotatable shaft journaled in the bicycle frame each assembly being comprised of a set of at least three adjacent sprocket wheels, the third assembly of adjacent sprocket wheels being comprised of a set of at least three adjacent sprocket wheels arranged in order by size and being smaller than the sprocket wheels of the first assembly of pedal sprocket wheels and the fourth assembly of sprocket wheels having at least three adjacent sprocket wheels substantially larger than the at least three sprocket wheels of the second drive wheel assembly, the third and fourth assemblies of sprocket wheels being mounted adjacent each other for movement together on a shaft journaled upon the bicycle frame,
   (d) a derailleur associated with the first sprocket assembly for moving a sprocket chain from one sprocket of the sprocket wheel assembly to another,
   (e) a pair of derailleurs associated with the third and fourth sets of sprocket wheels of the auxiliary gear arrangement, one for transfer of the drive chain from one of the larger sprocket wheels of the fourth sprocket wheel assembly to another and one for transferring the drive chain from one of the smaller sprocket wheels of the third sprocket wheel assembly to another, (f) a derailleur associated with the fourth assembly of adjacent small sprocket wheels for transferring a sprocket chain from one to the other of the adjacent small sprocket gears of such assembly, (g) a sprocket chain extending from the larger sprocket wheels of the fourth sprocket wheel assembly of the auxiliary gear arrangement to the second set of adjacent small sprocket wheels constituting the rear drive wheel assembly sprocket wheels, (h) a sprocket chain extending from the smaller sprocket wheels of the third sprocket wheel assembly of the auxiliary gear arrangement to the first sprocket assembly constituting the pedal sprocket wheels, (i) the intermediate auxiliary gear arrangement assembly being mounted between rear members of the bicycle frame which support the rear wheel of the bicycle and a single sturdy reinforcing bar extends from a pedal support journal of such bicycle to the intermediate auxiliary gear arrangement and rotatably supporting the rotatable shaft upon which the third and fourth assemblies of adjacent sprocket wheels are mounted and additionally positioning said third and fourth assemblies of sprocket wheels along the shaft such that said support bar directly opposes tension of the pedal drive chain between the pedal assembly and the intermediate auxiliary gear arrangement and at least partially opposes the tension of the rear drive chain between the first drive sprocket assembly and the intermediate auxiliary gear arrangement with reinforcement from the reinforcing bar providing overall a sturdy mounting for the intermediate gear arrangement shaft, (j) the upper end of the reinforcing bar having a fitting integrated thereupon with a portion of said fitting having a portion extending at least partially about a substantial portion of the shaft upon which the third and fourth assemblies of adjacent sprocket wheels are journaled to securely support and position such shaft and space the third and fourth assemblies of sprocket wheels on the shaft in line with the first and second sprocket assemblies respectively, and k. wherein the first and second sprocket assemblies connected to the respective foot operated pedals and the rear drive wheel assembly are on the same side of the bicycle frame and the fitting integral with the single reinforcing bar is positioned about a portion of the shaft upon which the third and fourth assemblies of adjacent sprocket wheels are mounted but on the opposite end of the shaft from that occupied by said third and fourth sprocket wheel assemblies which assemblies are mounted adjacent to each other in line respectively with the first and second sprocket wheel assemblies, the integral fitting thereby serving to both securely support the shaft and correctly space the said sprocket wheel assemblies on said shaft.

2. A drive arrangement in accordance with claim 1 wherein the second sprocket assembly associated with the rear drive assembly has at least four sprocket wheels.

3. A drive arrangement in accordance with claim 1 wherein the controls for the derailleurs are arranged on the handle bars of the bicycle in the arrangement order in which they will normally be used.

4. A drive arrangement in accordance with claim 1 wherein there is provided at least one set of sprocket gears in which the relative sizes of the sprocket wheels are relatively close together in overall size in order to facilitate fine adjustments in speed when the bicycle has reached a relatively high velocity.

5. A drive arrangement in accordance with claim 4 in which there are two sets of adjacent sprocket wheels with very closely sized sprocket wheels.

6. A drive arrangement in accordance with claim 5 wherein the two sets of adjacent sprocket wheels are the second and third sprocket assemblies.

* * * * *